(12) United States Patent
Shao et al.

(10) Patent No.: US 10,926,422 B2
(45) Date of Patent: Feb. 23, 2021

(54) HEAT DISSIPATING SYSTEM OF ROBOT

(71) Applicant: DELTA ELECTRONICS, INC., Taoyuan (TW)

(72) Inventors: Chi-Huan Shao, Taoyuan (TW); Chi-Shun Chang, Taoyuan (TW); Ching-Yu Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 183 days.

(21) Appl. No.: 16/239,373

(22) Filed: Jan. 3, 2019

(65) Prior Publication Data

US 2020/0101626 A1 Apr. 2, 2020

(30) Foreign Application Priority Data

Sep. 28, 2018 (CN) .......................... 201811141279.X

(51) Int. Cl.
*B25J 19/00* (2006.01)
*B25J 18/00* (2006.01)

(52) U.S. Cl.
CPC ........... *B25J 19/0054* (2013.01); *B25J 18/00* (2013.01)

(58) Field of Classification Search
CPC .... F16K 15/044; F16K 15/025; F16K 15/063; F16K 17/04; F16K 17/0406; B25J 19/0054; B25J 18/00
See application file for complete search history.

(56) References Cited

U.S. PATENT DOCUMENTS

2018/0147733 A1* 5/2018 Takeuchi ............. B25J 19/0054

FOREIGN PATENT DOCUMENTS

| CN | 101203669 A | 6/2008 |
|----|----|----|
| CN | 102380877 A | 3/2012 |
| CN | 103659837 A | 3/2014 |
| CN | 105531086 A | 4/2016 |
| CN | 106230176 A | 12/2016 |
| CN | 106976066 A | 7/2017 |
| EP | 0146783 A2 | 4/1985 |
| TW | 200704877 A | 2/2007 |
| WO | 2018173942 A1 | 9/2018 |

OTHER PUBLICATIONS

Jhou, Wang Jyun et al., Pneumatic and hydraulic technology, Jan. 2015, ISBN: 978-7-5643-3642-4.

* cited by examiner

*Primary Examiner* — P. Macade Nichols

(74) *Attorney, Agent, or Firm* — Kirton McConkie; Evan R. Witt

(57) ABSTRACT

A heat dissipating system of robot is provided. The heat dissipating system includes a gas supply device and a robot. The gas supply device is configured to provide a high-pressure gas. The robot is in communication with the gas supply device and includes a housing, an inlet and at least one valve. The housing defines an inner space. The inlet is disposed on the housing and is in communication with the gas supply device and the inner space. The at least one valve is disposed on the housing and is in communication with the inner space. The high-pressure gas outputted by the gas supply device is guided into the inner space through the inlet, and the high-pressure gas accommodated in the inner space is released through the at least one valve when the at least one valve is open.

12 Claims, 7 Drawing Sheets

HEAT DISSIPATING SYSTEM OF ROBOT

CROSS-REFERENCE TO RELATED APPLICATION

This application claims priority to China Patent Application No. 201811141279.X, filed on Sep. 28, 2018, the entire content of which is incorporated herein by reference for all purposes.

FIELD OF THE DISCLOSURE

The present disclosure relates to a heat dissipating system, and more particularly to a heat dissipating system of a robot.

BACKGROUND OF THE DISCLOSURE

Nowadays, robots have been extensively applied. Robots usually have rotating joints for moving and operating, and the joints are driven by motors. Since the inner space of the robot is relatively sealed, it is hard to naturally dissipate the heat generated by the rotation of joints and the operation of motors. Therefore, the heat is accumulated, and the over-accumulated heat may affect the operation of the robot. Consequently, it is important to dissipate the heat in the inner space of the robot for keeping the robot operating normally.

For dissipating the heat of the inner space of the robot, the gas outputted by the external gas source is guided into the inner space of the robot. The prior heat dissipation technique disposes the gas tube with holes in the inner space of the robot. The gas outputted by the external gas source is guided into the gas tube and is released into the inner space of the robot through the holes of the gas tube. Therefore, the elements may probably be over-heated, e.g. motor, are cooled. However, disposing the gas tube increases the cost, and the design of the wiring inside the robot is more complicated.

Therefore, there is a need of providing a heat dissipating system of a robot in order to overcome the above drawbacks.

SUMMARY OF THE DISCLOSURE

An object of the present disclosure provides a heat dissipating system of a robot. The gas supply device in communication with the robot outputs the high-pressure gas to the inner space of the robot. When the valve of the robot is open, the high-pressure gas in the inner space is released through the valve. Consequently, the inner space of the robot is cooled. In addition, the high-pressure gas for heat dissipation is supplied by the gas supply device, and thus the gas supply device can adjust the flow of the outputted high-pressure gas according to the actual requirements. Moreover, the high-pressure gas accommodated in the inner space of the robot is released only when the valve is open. Since the pressure of the high-pressure gas is larger than the atmospheric pressure of the external air, the external air is prevented from flowing into the inner space of the robot through the valve when the valve is open. Therefore, the robot has a high Ingress Protection (IP).

In accordance with an aspect of the present disclosure, there is provided a heat dissipating system of robot. The heat dissipating system includes a gas supply device and a robot. The gas supply device is configured to provide a high-pressure gas. The robot is in communication with the gas supply device and includes a housing, an inlet and at least one valve. The housing defines an inner space. The inlet is disposed on the housing and is in communication with the gas supply device and the inner space. The at least one valve is disposed on the housing and is in communication with the inner space. The high-pressure gas outputted by the gas supply device is guided into the inner space through the inlet, and the high-pressure gas accommodated in the inner space is released through the at least one valve when the at least one valve is open.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
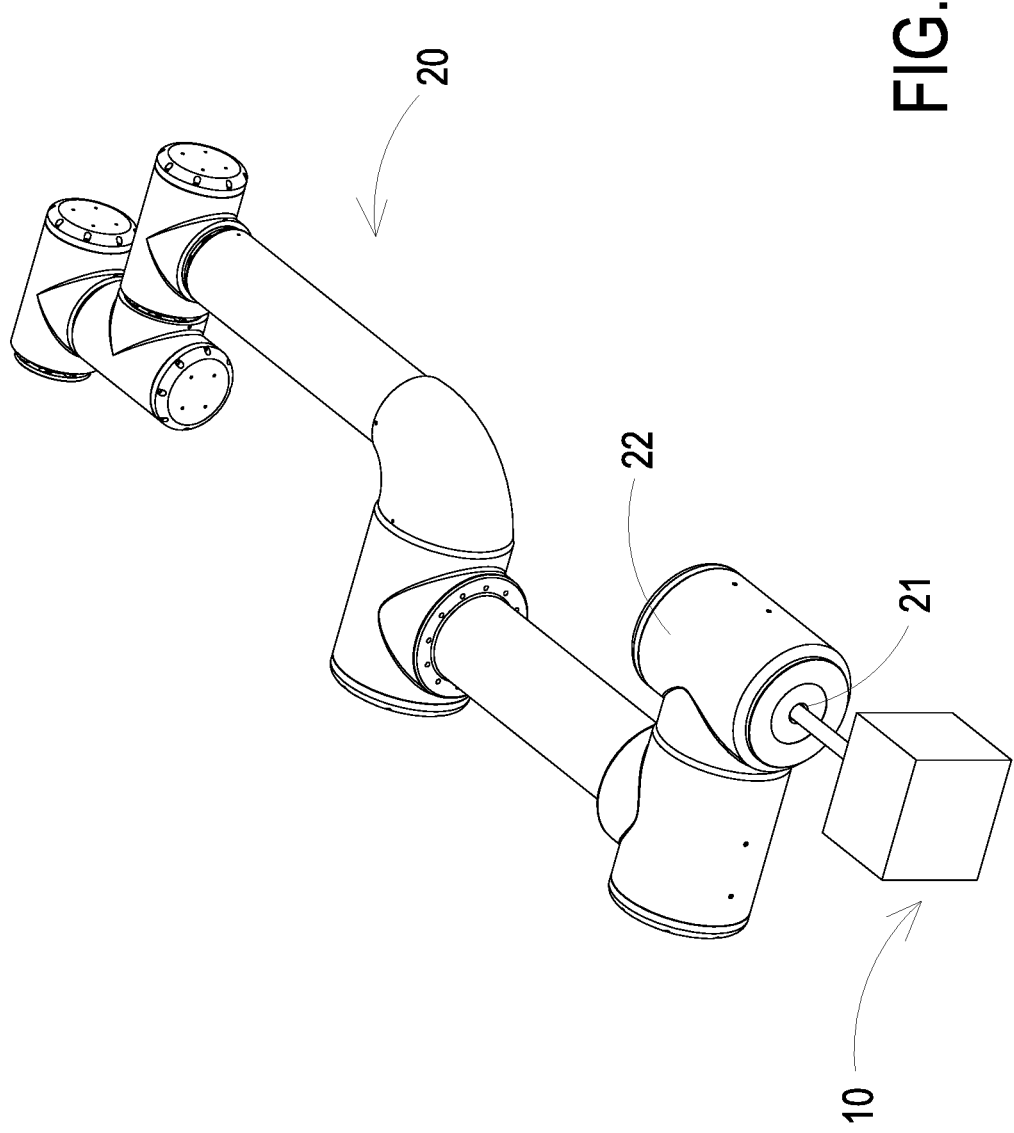
FIG. 1 is a schematic perspective view illustrating a heat dissipating system of a robot according to an embodiment of the present disclosure.
Figure 2:
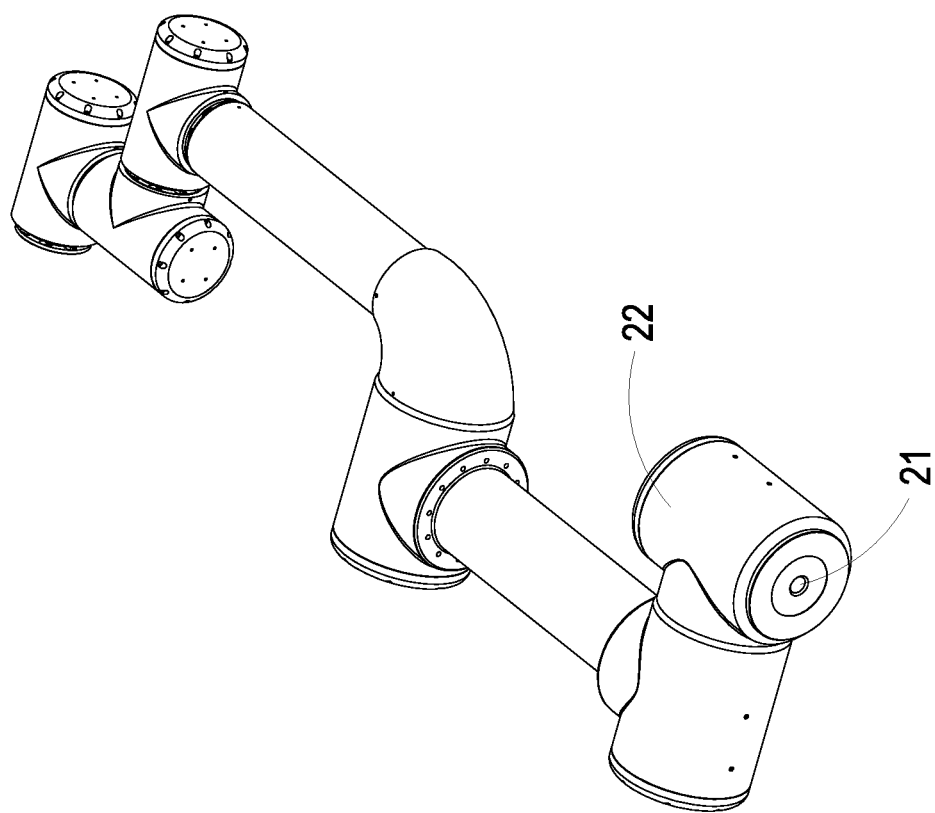
FIG. 2 is a schematic perspective view illustrating the robot of FIG. 1.
Figure 3:
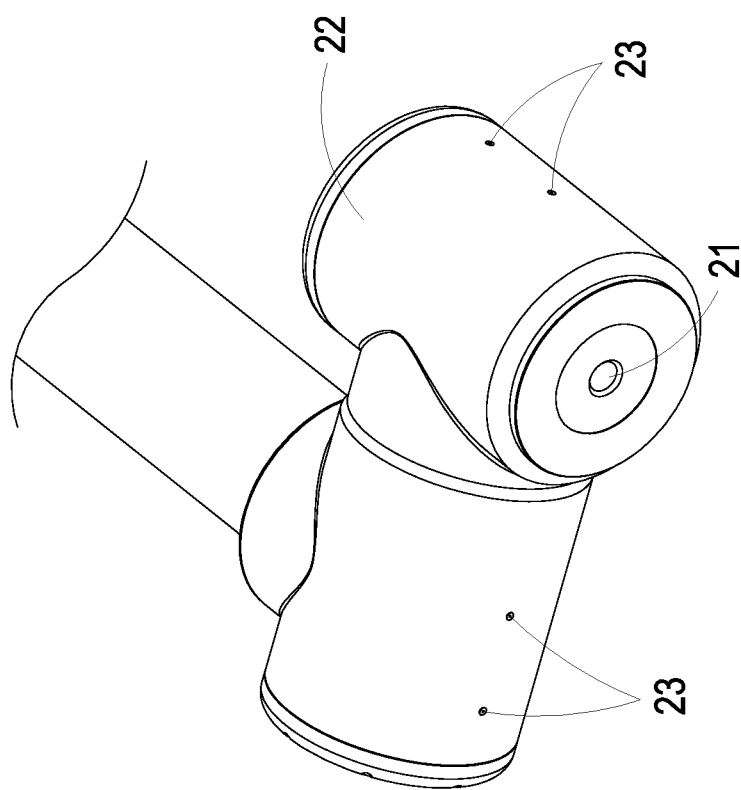
FIG. 3 is a partial schematic perspective view illustrating the robot of FIG. 1.
Figure 4:
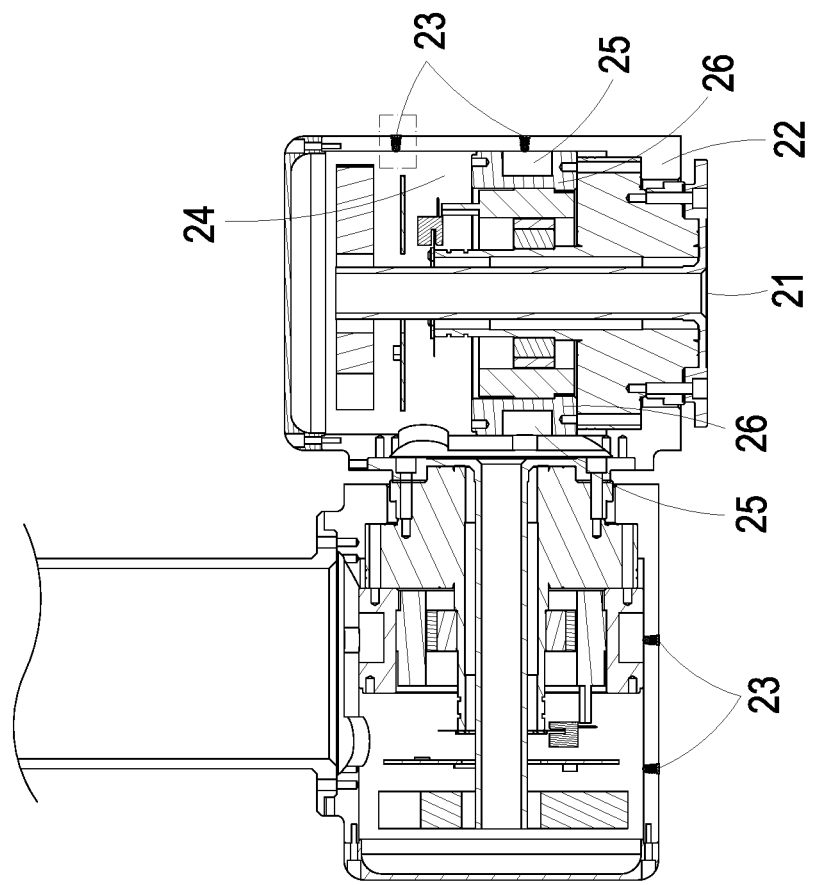
FIG. 4 is a cross-section view of the partial structure of the robot of FIG. 3.

FIG. 1 is a schematic perspective view illustrating a heat dissipating system of a robot according to an embodiment of the present disclosure, FIG. 2 is a schematic perspective view illustrating the robot of FIG. 1, FIG. 3 is a partial schematic perspective view illustrating the robot of FIG. 1, and FIG. 4 is a cross-section view of the partial structure of the robot of FIG. 3. As shown in FIGS. 1, 2, 3 and 4, a heat dissipating system 1 of robot includes a gas supply device 10 and a robot 20, and the gas supply device 10 and the robot 20 are in communication with each other. The gas supply device 10 is configured to provide the high-pressure gas to the robot 20. The pressure of the high-pressure gas is higher than the atmospheric pressure. The gas supply device 10 is able to adjust the flow of the outputted high-pressure gas.

The robot 20 includes an inlet 21, a housing 22 and at least one valve 23. The inlet 21 and the valve 23 are disposed on the housing 22, and the housing 22 defines an inner space 24. The inner space 24 is in communication with the inlet 21 and the valve 23 respectively, and the inlet 21 is in communication with the gas supply device 10. The high-pressure gas outputted by the gas supply device 10 flows into the inner space 24 of the robot 20 through the inlet 21, and the inner space 24 is filled with the high-pressure gas. When the valve 23 is closed, the inner space 24 of the robot 20 is isolated from the space outside the robot 20 due to the sealing characteristic of the housing 22 of the robot 20. In addition, the housing 22 has a hollow tubulous space for wiring, and thus the high-pressure gas is allowed to flow into anywhere, even the end axle of the robot 20, in the housing 22 without leaking. Therefore, there is no need to dispose additional gas tube. When the valve 23 is open, the high-pressure gas in the inner space 24 is released to the space outside the robot 20 through the valve 23. Since the pressure of the high-pressure gas is larger than the atmospheric pressure of the external air, the external air is prevented from flowing into the inner space 24 of the robot 20 through the valve 23. Consequently, the inner space 24 of the robot is cooled, and the robot 20 has a high IP. The robot 20 is for example but not limited to a service robot, a collaborative robot or an industrial robot.

In addition, the communication way between the inlet 21 of the robot 20 and the gas supply device 10 can be adjusted according to actual requirements and is not limited to the tube shown in FIG. 1. The communication way only has to protect the high-pressure gas from leaking during the high-pressure gas being outputted to the inlet 21 by the gas supply device 10. Moreover, the inlet 21 is allowed to be disposed on anywhere on the housing 22 if the inlet 21 will not retard the operation of the robot 20. The inlet 21 is not limited to be disposed on the position shown in FIG. 2.

In an embodiment, the valve 23 is disposed neighboring to the elements having higher heat dissipation demand such as motors and axles. When the valve 23 is open, the high-pressure gas in the inner space 24 of the robot 20 is released through the valve 23. Therefore, the airflow near the valve 23 is larger, which benefits cooling the elements near the valve 23, and thus the heat dissipation efficiency is enhanced.

In an embodiment, the valve 23 is a one-way valve configured for limiting the flow direction of the gas. Accordingly, the high-pressure gas accommodated in the inner space 24 is released to the space outside the robot 20 through the valve 23, and the external air is prevented from flowing into the inner space 24 through the valve 23. In this embodiment, the valve 23 is opened by the pressure difference between the high-pressure gas in the inner space 24 and the external air. Thus, the high-pressure gas is automatically released through the valve 23 without controlling the valve 23. In this embodiment, the valve 23 is a valve being able to realize the one-way air flowing.

Figure 5A:
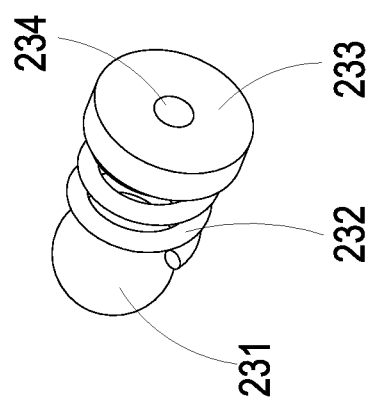
FIG. 5A is a schematic perspective view illustrating the valve of FIG. 3.
Figure 5B:
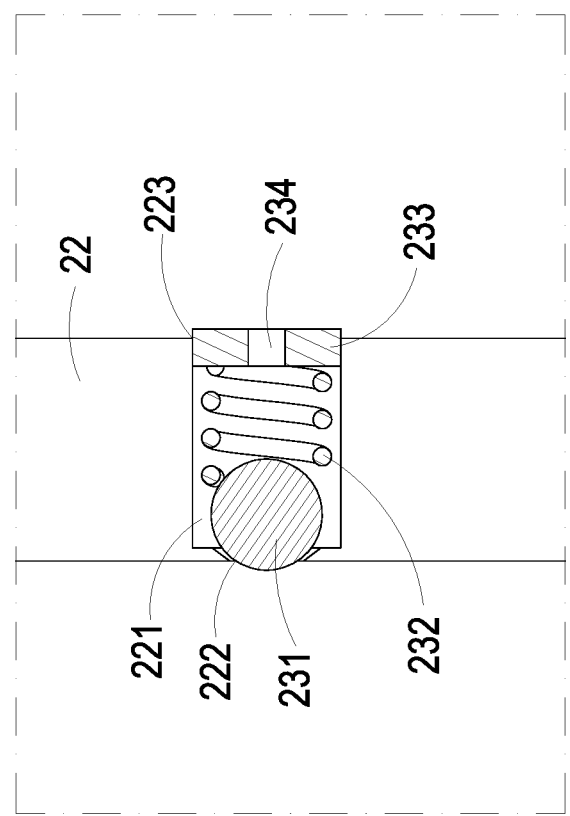
FIG. 5B is an enlarged graph of the dashed line block of FIG. 4.

In an embodiment, as shown in FIGS. 5A and 5B, the valve 23 as a one-way valve includes a ball 231, an elastic element 232 and a stopping block 233 connected with each other. The stopping block 233 has a hollow portion 234. Preferably but not exclusively, the elastic element 232 is a spring. The housing 22 has an accommodation space 221. The accommodation space 221 is in communication with the inner space 24 and the space outside the robot 20 via the first opening 222 and the second opening 223 respectively. The valve 23 is disposed within the accommodation space 221. The ball 231 is aligned with the first opening 222, and the diameter of the ball 231 is larger than the diameter of the first opening 222. The accommodation space 221 is in communication with or isolated from the inner space 24 according to the relative position between the ball 231 and the first opening 222. The stopping block 233 is aligned with the second opening 223, and the diameter of the stopping block 233 is equal to the diameter of the second opening 223. The accommodation space 221 is in communication with the space outside the robot 20 via the hollow portion 234. Concretely, when the pressure of the high-pressure gas in the inner space 24 is larger than the external pressure, the pressure difference between the pressure of the high-pressure gas and the external pressure drives the ball 231 to move toward the stopping block 233. The elastic element 232 is compressed by the ball 231. Consequently, the valve 23 is opened. The accommodation space 221 is in communication with the inner space 24 via the first opening 222, and the high-pressure gas in the inner space 24 is released to the space outside the robot 20 through the accommodation space 221 and the hollow portion 234. The external pressure is for example but not limited to include the atmospheric pressure, the elasticity of the elastic element 232 and/or the weight of the ball 231. Whereas, when the pressure of the high-pressure gas in the inner space 24 is smaller than the external pressure, or when the gas supply device 10 stops providing the high-pressure gas, the resilience of the elastic element 232 pushes the ball 231 to move toward the first opening 222. The first opening 222 is fully covered by the ball 231. Consequently, the valve 23 is closed. The accommodation space 221 is isolated from the inner space 24, and the external air outside the robot 20 is prevented from flowing into the inner space 24 through the hollow portion 234 and the accommodation space 221.

In an embodiment, the valve 23 is an electronic valve. The robot 20 further includes a control unit (not shown). The control unit is electrically connected with the valve 23 and is configured to control the on/off of the valve 23. Moreover, the above-mentioned one-way valve can be an electronic valve as well. By the control unit controlling the on/off of the valve 23 and the gas supply device 10 adjusting the flow of the high-pressure gas, the heat dissipating system 1 can adjust the intensity of cooling the inner space 24 of the robot 20 according to the actual heat dissipation demands. Therefore, unnecessary loss is avoided. In an embodiment, the robot 20 further includes at least one temperature sensor (not shown). The temperature sensor is disposed in the inner space 24 of the robot 20 and is electrically connected with the control unit and the gas supply device 10. The temperature sensor is configured to detect the temperature of the inner space 24 of the robot 20 and generate a feedback signal accordingly. The control unit receives the feedback signal outputted by the temperature sensor, and the control unit controls the on/off of the valve 23 according to the temperature of the inner space 24 reflected by the feedback signal.

In an embodiment, plural temperature sensors are disposed in the different areas of the inner space 24, and the plural temperature sensors are corresponding to the valves 23 at different positions. When the control unit receives the feedback signal from a temperature sensor, the control unit can control the on/off of the valve 23 corresponding to that temperature sensor according to the area temperature reflected by the feedback signal.

In an embodiment, control unit monitors the input voltage or the input current of the robot 20 via the electric control system. When the robot 20 is in a high energy consumption state, the heat dissipating system 1 requires better heat dissipating ability. Accordingly, the control unit controls the valve 23 to open and controls the gas supply device 10 to increase the flow of the high-pressure gas. When the robot 20 is in a low energy consumption state, the heat dissipating system 1 requires less heat dissipating ability. Accordingly, the control unit controls the valve 23 to close and/or controls the gas supply device 10 to decrease the flow of the high-pressure gas or stop providing the high-pressure gas.

Figure 6:
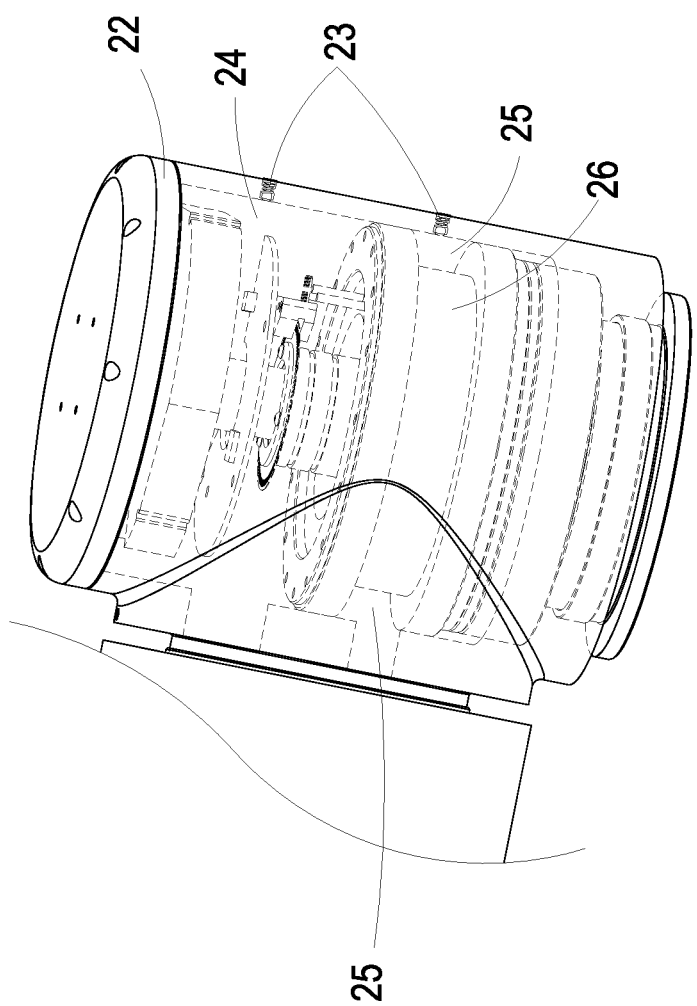
FIG. 6 is a schematic view showing the partial interior structure of the robot of FIG. 1.

In an embodiment, the robot 20 includes at least one gas channel 25. The gas channel 25 is disposed in the inner space 24 and is in communication with the inner space 24 and the valve 23. Moreover, the gas channel 25 is disposed neighboring to the elements having high heat dissipation demand such as motors and axles. For example, as shown in FIG. 6, where the structure inside the housing 22 is depicted with dashed lines. The gas channel 25 is a ditch disposed neighboring to the exterior of the circular wall of the motor stator 26, and the position of the ditch is corresponding to the position of the valve 23. By disposing the gas channel 25, the high-pressure gas is guided therein. Therefore, the flow of the high-pressure gas passing through the elements neighboring to the gas channel 25 is increased, and the heat dissipation to specific elements in the inner space 24 is enhanced.

From the above descriptions, the present disclosure provides a heat dissipating system of a robot. The gas supply device in communication with the robot outputs the high-pressure gas to the inner space of the robot. When the valve of the robot is open, the high-pressure gas in the inner space is released through the valve. Consequently, the inner space of the robot is cooled. In addition, the high-pressure gas for heat dissipation is supplied by the gas supply device, and thus the gas supply device can adjust the flow of the outputted high-pressure gas according to the actual requirements. Moreover, the high-pressure gas accommodated in the inner space of the robot is released only when the valve is open. Since the pressure of the high-pressure gas is larger than the atmospheric pressure of the external air, the external air is prevented from flowing into the inner space of the robot through the valve when the valve is open. Therefore, the robot has a high Ingress Protection (IP). Furthermore, when the valve is open, the high-pressure gas in the inner space of the robot is released through the valve, and the flow of the gas near the valve is larger. Accordingly, for enhancing the efficiency of heat dissipation, the valve is disposed near the elements having high heat dissipating requirement, and even the gas channel is disposed accordingly.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A heat dissipating system, comprising:
   a gas supply device configured to provide a high-pressure gas; and
   a robot in communication with the gas supply device, comprising:
      a housing, wherein the housing defines an inner space;
      an inlet disposed on the housing, wherein the inlet is in communication with the gas supply device and the inner space; and
      at least one valve disposed on the housing, wherein the at least one valve is in communication with the inner space,
   wherein the high-pressure gas outputted by the gas supply device is guided into the inner space through the inlet, and the high-pressure gas accommodated in the inner space is released through the at least one valve when the at least one valve is open, wherein the valve is a one-way valve, the valve is configured to allow the high-pressure gas accommodated in the inner space to be released to a space outside the robot through the valve, and the valve is configured to prevent an external air outside the robot from flowing into the inner space through the valve.

2. The heat dissipating system according to claim 1, wherein the valve comprises a ball, an elastic element and a stopping block connected with each other, the stopping block comprises a hollow portion, the housing comprises an accommodation space, the accommodation space is in communication with the inner space and the space outside the robot via a first opening and a second opening, the valve is disposed in the accommodation space, the ball is aligned with the first opening, a diameter of the ball is larger than a diameter of the first opening, the stopping block is aligned with the second opening, a diameter of the stopping block is equal to a diameter of the second opening, and the accommodation space is in communication with the space outside the robot via the hollow portion.

3. The heat dissipating system according to claim 2, wherein when a pressure of the high-pressure gas in the inner space is higher than an external pressure, the ball is driven to move toward the stopping block by the pressure of the high-pressure gas, the elastic element is compressed by the ball, the valve is opened, the accommodation space is in communication with the inner space via the first opening, and the high-pressure gas accommodated in the inner space is released to the space outside the robot through the accommodation space and the hollow portion, wherein when the pressure of the high-pressure gas in the inner space is smaller than the external pressure, the ball is driven to move toward the first opening by a resilience of the elastic element, the first opening is fully covered by the ball, the valve is closed, the accommodation space is isolated from the inner space, and the external pressure comprises an atmospheric pressure, an elasticity of the elastic element and/or a weight of the ball.

4. The heat dissipating system according to claim 1, wherein the valve is an electronic valve, the robot further comprises a control unit electrically connected with the valve, and the control unit is configured to control the on/off of the valve.

5. The heat dissipating system according to claim 4, wherein the robot further comprises at least one temperature sensor electrically connected with the control unit, the temperature sensor is configured to detect a temperature of the inner space and generate a feedback signal accordingly, and the control unit receives the feedback signal and control the on/off of the valve according to the feedback signal.

6. The heat dissipating system according to claim 5, wherein the at least one temperature sensor is electrically connected with the gas supply device, and the gas supply device receives the feedback signal and controls a flow of the outputted high-pressure gas according to the feedback signal.

7. The heat dissipating system according to claim 6, wherein the robot further comprises plural temperature sensors corresponding to plural valves at different positions, and the control unit controls the on/off of the valve according to the corresponding temperature sensor.

8. The heat dissipating system according to claim 1, wherein the valve is disposed neighboring to plural elements having high heat dissipation demand in the inner space.

9. The heat dissipating system according to claim 1, wherein the robot further comprises at least one gas channel disposed in the inner space of the robot, and the gas channel is corresponding to and in communication with the valve.

10. The heat dissipating system according to claim 9, wherein the gas channel has a ditch disposed neighboring to an exterior of an element having high heat dissipation demand.

11. The heat dissipating system according to claim 1, wherein a pressure of the high-pressure gas is larger than an atmospheric pressure.

12. The heat dissipating system according to claim 1, wherein the housing of the robot has sealing characteristic, and when the valve is closed, the inner space of the robot is isolated from a space outside the robot.

* * * * *